United States Patent [19]

Stock et al.

[11] 4,399,968
[45] Aug. 23, 1983

[54] CONTROLLED OUTPUT FORCE ACTUATOR

[75] Inventors: William H. Stock, Columbus; Bernard C. Holland, Jr., Pickerington, both of Ohio

[73] Assignee: Rockwell International Corporation, El Segundo, Calif.

[21] Appl. No.: 150,465

[22] Filed: May 16, 1980

[51] Int. Cl.³ .............................................. B64D 1/02
[52] U.S. Cl. ............................... 244/137 R; 89/1.5 F; 89/1.5 G; 91/25
[58] Field of Search .................. 244/137 R; 89/1.5 R, 89/1.5 F, 1.5 G, 1.5 H; 91/25, 26, 407, 408; 92/151; 188/285, 287; 294/83 AC

[56] References Cited

U.S. PATENT DOCUMENTS

| | | | |
|---|---|---|---|
| 2,991,759 | 7/1961 | Pilch | 91/407 |
| 3,131,606 | 5/1964 | Oelue | 92/151 |
| 3,457,840 | 7/1969 | Grimes | 92/151 |
| 3,554,088 | 1/1971 | Bruyn | 92/151 |
| 3,677,141 | 7/1972 | Lagerquist et al. | 91/407 |
| 3,731,770 | 5/1973 | Bindon | 188/285 |
| 3,756,545 | 9/1973 | Coutin | 244/137 R |
| 3,797,615 | 3/1974 | Stembridle | 188/285 |
| 4,088,287 | 5/1978 | Hasquenoph et al. | 244/137 R |
| 4,246,472 | 1/1981 | Sun et al. | 244/137 R |

FOREIGN PATENT DOCUMENTS

| | | | |
|---|---|---|---|
| 4483 | 10/1979 | European Pat. Off. | 91/408 |
| 2447476 | 8/1980 | France | 91/408 |

*Primary Examiner*—Trygve M. Blix
*Assistant Examiner*—C. T. Bartz
*Attorney, Agent, or Firm*—Charles T. Silberberg

[57] ABSTRACT

An actuator for ejecting a store from an aircraft, with a pre-selected force vs stroke profile, is disclosed. The actuator comprises a cylinder and a fixed tubular member coupled to a source of fluid under pressure having a first array of orifices for flowing fluid into the cylinder. A piston assembly is provided, which is adapted to engage and eject the store. The iston assembly is slidably mounted within the cylinder and telescopically movable over the fixed tubular member from a first position, wherein the piston assembly covers a portion of the first array of orifices, to a second position, wherein the first array of orifices is uncovered. Typically, the pressure level of the source of fluid varies, generally as a function of the flow into the cylinder during the stroke of the piston assembly. Thus, the cross-sectional area and spacing of each of the orifices of the first array is selected to maintain a desired pre-selected pressure vs stroke profile within the cylinder upon the application of the fluid to the fixed tubular member, as the initially covered portion of the first array of orifices are uncovered during the stroke. Therefore, upon initiation of fluid flow, the first array of orifices meters the fluid into the cylinder at a rate sufficient to maintain the pre-selected pressure vs stroke profile therein.

A system for varying the magnitude of the pressure vs stroke profile within the cylinder is provided, which comprises an adjustable tubular member coupled to the source of fluid, rotatably mounted in a bore within the fixed tubular member. The adjustable tubular member incorporates a second array of orifices which are in a one-to-one relationship with the first array of orifices. Preferably, an electric motor is provided to rotate the adjustable tubular member varying the overlap of the first and second array of orifices, such that the magnitude of the pre-selected pressure vs stroke profile can be varied.

21 Claims, 6 Drawing Figures

CONTROLLED OUTPUT FORCE ACTUATOR

BACKGROUND OF THE INVENTION

1. Field of Invention

The invention relates to the field of fluid powered actuators, in particular to an actuator for ejecting stores from an aircraft.

2. Description of Prior Art

The gravity release of stores from an aircraft flying at high speeds, and particularly supersonic speeds, is not practicable. The high velocity of the air and the shock waves produced by the wings and fuselage disrupt the trajectory of the store, reducing accuracy; and sometimes causing store to store or store to aircraft collisions. Thus, such aircraft usually incorporate ejector mechanisms in the stores racks so that, upon release, the store will be rapidly separated from the aircraft minimizing the effect of the airflow.

A typical prior art ejector system is disclosed in U.S. Pat. No. 3,883,097, Device for Picking Up and Ejecting Loads Under an Aircraft by Billot. Billot discloses a bomb rack with fore and aft ejector cylinders. The ejection pressure is provided by an explosive cartridge which fires into a central chamber. The gases are conducted from the chamber by passageways to each ejector cylinder. Thus, with the Billot design, the only way to change the ejection force is to change the power output of the cartridge. This is a serious shortcoming for it's important to have the capability to vary the ejection force as a function of the size and/or the weight of the store, and the particular maneuver used by the aircraft during delivery. Thus, in order to achieve this capability a large number of cartridges with different power outputs must be stocked. But this will only provide discrete changes in output force and the ejection force cannot be reprogrammed in flight. There is also no provision for controlling the gas pressure applied to each ejector so that the pitch angle of the store can be varied as it is ejected from the aircraft.

The pitch angle at which the store is ejected from the aircraft may also have to be varied as a function of the particular maneuver of the aircraft during delivery to achieve acceptable accuracies and safe separations. Furthermore, the gas pressure from the cartridge immediately rises to a high peak and then decays as a function of piston stroke and cooling of the explosive products, and thus the force applied to the store during ejection is non-linear. This makes the computation of the trajectory of the store more complicated than it would be if the force were constant, and requires a longer stroke in order to achieve acceptable separation velocities.

The advantage of having a constant ejection force becomes obvious when it is realized that force equals the mass times the acceleration (F=MA), thus, with a constant force the store will be ejected at a constant acceleration rate. This, of course, makes the computation of trajectories much simpler, and minimizes the stroke length, ejector reaction loads and stroke accelerations.

Another example is U.S. Pat. No. 3,610,094, Ejector Release Units for Use in Aircrafts by Craigie. Craigie discloses a stores rack with explosively actuated ejector pistons. Diverter valves are provided for controlling the gas pressure applied to each of the ejector pistons. While such a system can vary the pitch of the store by causing a differential pressure to exist in each ejector, there is no method disclosed to ensure that a constant force is applied to the store during ejection.

A further example of an ejector system can be found in U.S. Pat. No. 3,974,990, Dual Ejector Stores Attitude Control System by Holt, et al. Holt, et al. disclose a pneumatically actuated ejector mechanism. A pneumatic pressure source is used to drive a coupling piston into a liquid filled actuation cylinder containing an ejector piston. The actuation cylinder also incorporates a pressure relief piston. Upon actuation, pneumatic pressure drives the coupling piston into the liquid within the actuation cylinder compressing the relief piston. Thus, initially no force is applied to the ejector piston. After the relief piston has moved to its stop, pressure builds up against the ejector piston. Thus, not only can the overall force applied be controlled by setting the pneumatic pressure level, but the stroke of the ejector against each end of the store can be adjusted for pitch control. But, this system is very complicated and inefficient in that it does not provide a constant ejection force.

As previously mentioned, one of the problems of using explosively actuated cartridges as the power source is that very high initial peak pressures are generated followed by a rapid decay in pressures. Attempts to alleviate this problem have centered on changing the effective cross-sectional area of the ejector piston. For example, U.S. Pat. No. 4,049,222, Ejector Rack for Nuclear Stores by Peterson. In the Peterson design, at the start of the stroke, when gas pressure is high, the gas enters through a probe engaged with a small cavity inside the piston, and, thus, the probe effectively seals off a large portion of the piston area. As the piston starts to move downward, the increase in volume tends to reduce the pressure and, in order to compensate for this pressure reduction, the probe allows the gas to act on additional discrete areas of the top of the piston after predetermined increments of piston travel. But, Peterson does not disclose a method of varying the force for pitch control, nor does he disclose a method of varying the overall pressure level within the cylinder to accommodate different sizes and/or weights of stores.

Other systems for ejecting stores can be found in U.S. Pat. No. 3,009,730, Ejector for External Carriage Stores by E. K. Gantschnigs, et al., U.S. Pat. No. 3,810,671, Jettison Device for Helicopter Load Carrying System by Jeffrey, and U.S. Pat. No. 3,877,343, Stores Carrier by Newell, et al.

Of course, variable output force actuation cylinders are not new, of example, U.S. Pat. No. 1,081,690, Automatic Plunger Elevator by Morton. Morton discloses a hydraulically powered actuator cylinder for lifting an elevator which comprises a central piston encased in a sleeve. The piston and sleeve ride within an outer cylinder having an array of orifices. Fluid enters through the array of orifices and as the piston and sleeve rise, the sleeve uncovers additional orifices, increasing the flow rate into the cylinder, and, thus, the force applied to the piston. The disadvantage of this actuator is that because the piston rides within the sleeve, the piston area upon which pressure can be applied is necessarily small in relationship to the overall size of the actuator and, thus, the available output force to size and/or weight ratio is low. For this reason, and the fact that there is no provision for setting the level of the constant force output, it is unattractive for use as a stores ejector.

Of additional interest are U.S. Pat. No. 3,797,615, Impact Cushioning Device by Stembridge, and U.S. Pat. No. 3,731,770, Adjustable Shock Absorber by Binden. Both Stembridge and Binden disclose shock absorber cylinders which use similar mechanisms to vary resistance as a function of stroke. A piston is movably mounted within the cylinder having a bore which engages a first tube having a first array of orifices. Within the first tube is a second tube rotatably mounted therein, having a second array of orifices. Thus, when the piston rod is impacted, the piston moves in a direction so as to sequentially cover the first array of orifices, and the flow rate out of the cylinder into the second tube decreases as a function of stroke. Rotation of the second tube varies the overlap of the first arrays of orifices and, therefore, provides a method for varying the overall resistance to stroke. The functioning and purpose, therefore, of these two shock absorbers is exactly opposite to that desired of an actuator for ejecting a store.

Therefore, it is a primary object of this invention to provide an actuator with a pre-selected output force vs stroke profile.

It is another object of this invention to provide an actuator with a pre-selected output force vs stroke profile adapted to utilize a variable pressure level source.

A further object of this invention is to provide an actuator with a substantially constant output force vs stroke profile adapted to utilize a variable pressure level source.

A still further object of this invention is to provide an actuator wherein the magnitude of a pre-selected output force vs stroke profile is infinitely adjustable.

SUMMARY OF THE INVENTION

The invention is an actuator, primarily adapted to eject a store from an aircraft. The device comprises a cylinder and a fixed tubular member coupled to a source of fluid under pressure having a first array of orifices for flowing the fluid into the cylinder. A piston assembly is provided to engage and eject the store, which is slidably mounted within the cylinder and telescopically movable over the fixed tubular member from a first position, wherein the piston assembly covers a portion of the first array of orifices, to a second position, wherein the first array of orifices are uncovered, the first and second positions defining the stroke of the piston assembly. Thus, upon the application of fluid to the fixed tubular member, the fluid flows through the first array of orifices into the cylinder and against the piston assembly, causing the piston assembly to engage and eject the store.

Generally, the pressure of the source of fluid varies as a function of the flow rate into the cylinder during the stroke of the piston assembly. Therefore, the cross-sectional area and spacing of the orifices of the first array are selected to maintain a pre-selected pressure vs stroke profile within the cylinder, upon the application of the fluid to the fixed tubular member, as the covered portion of the first array of orifices are uncovered during the stroke. Thus, regardless of the pressure level of the source of fluid, the pressure vs stroke profile is maintained. Preferably, the pressure level within the cylinder is maintained at a constant level, thus insuring that a constant force is applied to the piston. This results in the application of a constant force to the store during ejection.

The actuator, preferably, incorporates a means to vary the magnitude of the constant pressure within the cylinder. This means takes the form of an adjustable tubular member rotatably mounted in a bore in the fixed tubular member. The adjustable tubular member also has a bore which is coupled to the source of fluid. The adjustable tubular member has a second array of orifices in a one-to-one relationship with the first array of orifices. Means, typically in the form of an electric motor, are provided to rotate the adjustable tubular member varying the overlap of the first and second array of orifices, such that, upon the application of fluid to the bore of the adjustable tubular member, the magnitude of the pre-selected pressure vs stroke profile can be varied.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressedly understood, however, that the drawings are for purposes of illustration and description only, and are not intended as a definition of the limits of the invention.

BRIEF DESCRIPTION OF THE DRAWINGS

FIG. 2 illustrates a cross-sectional view looking inward of the forward actuator shown in FIG. 1.

FIG. 2a illustrates an enlarged portion of FIG. 2 showing an alternate orifice arrangement.

DESCRIPTION OF PREFERRED EMBODIMENT

Figure 1:
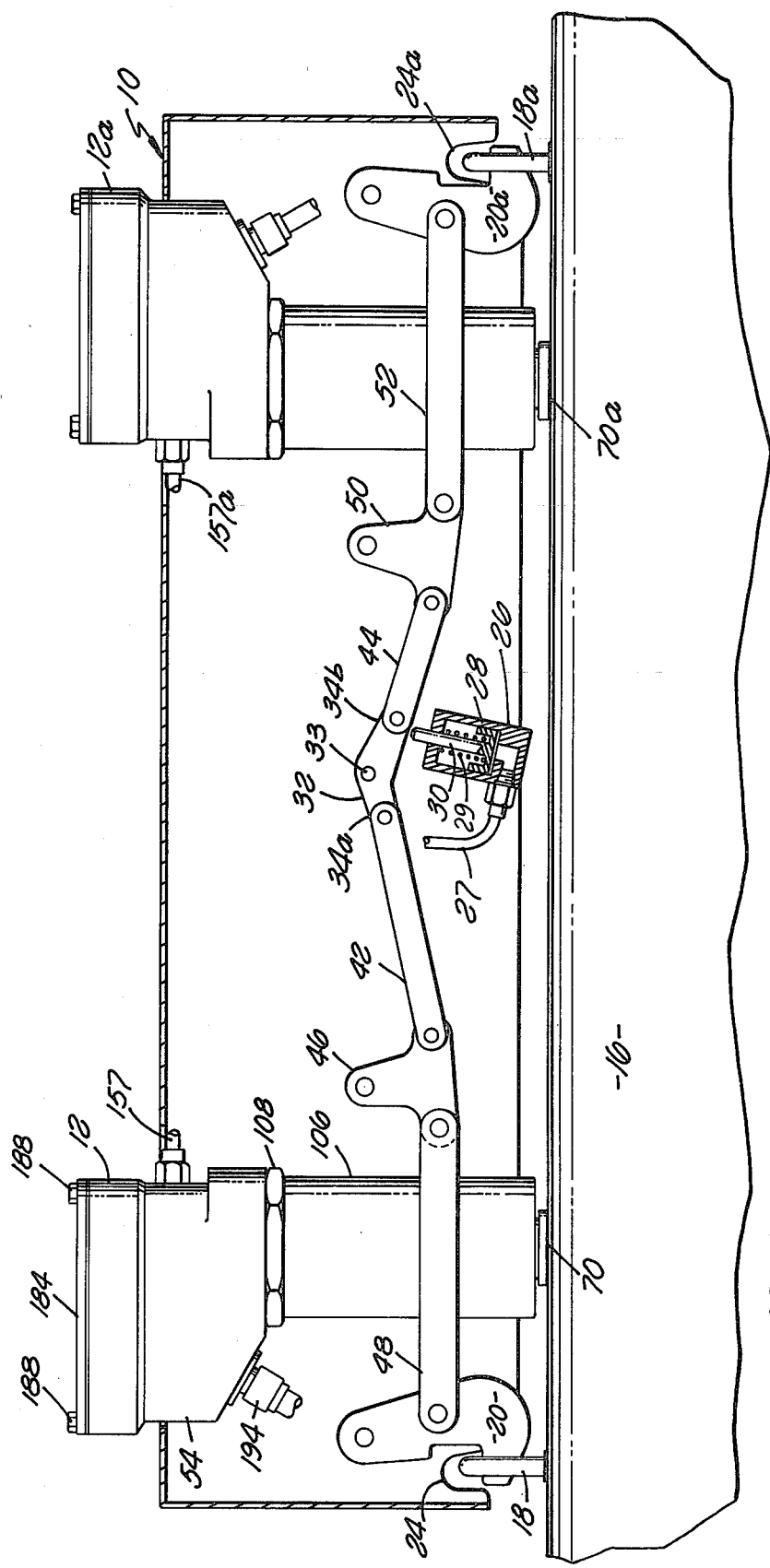
FIG. 1 illustrates a side elevation view of a stores rack, partially broken away to show forward and rear actuators mounted in the interior thereof.

Illustrated in FIG. 1 is a side elevation view of a store suspension and ejector rack designated by numeral 10 for use on an aircraft (not shown), partially broken away to show the interior thereof. Mounted within the rack 10 are forward and rear actuators 12 and 12a, respectively, for ejecting a store 16. The store 16 is attached to the rack 10 by a conventional suspension system comprising forward and rear lugs 18 and 18a, respectively, mounted on the store which engage retractable hooks 20 and 20a, respectively, pivotably mounted in the bomb rack 10. With the lugs 18 and 18a inserted into the notches 24 and 24a in the rack 10, respectively, the hooks 20 and 20a, which are biased toward the lugs by springs (not shown) secure the store 16 to the rack 10.

Release of the store 16 is accomplished by the application of hydraulic pressure to actuator 26 via hydraulic line 27 (in a manner to be subsequently discussed) which forces piston 28 upward overcoming the resistance of spring 29, causing piston rod 30, coupled thereto, to engage bell crank 32. The bell crank 32 is pivotally connected at its center 33 to the rack 10 and pivotally connected at its ends 34a and 34b to link 42 and 44, respectively. Link 42, in turn, is pivotally connected to bell crank 46, pivotably mounted to the rack 10. A link 48 is pivotally connected at its ends to both bell crank 46 and to hook 20. Link 44 is pivotally connected to bell crank 50 (which is pivotally mounted to rack 10). A link 52 is pivotally connected at its ends to both bell crank 50 and hook 20a. Thus, when piston rod 30 engages bell crank 32, it rotates about its center 33 causing link 42 to lower and link 44 to raise, pulling hooks 20 and 20a toward each other and out of engagement with lugs 18 and 18a, thus, releasing the store 16.

While the hooks 20 and 20a will secure the store 16 to the rack 10, the connection is obviously a loose one and typically the rack will incorporate sway braces (not shown). Typical sway braces are disclosed in U.S. Pat. No. 3,610,094, Ejector Release Units For Use On Aircraft by Craigie.

Figures 2, 2A:
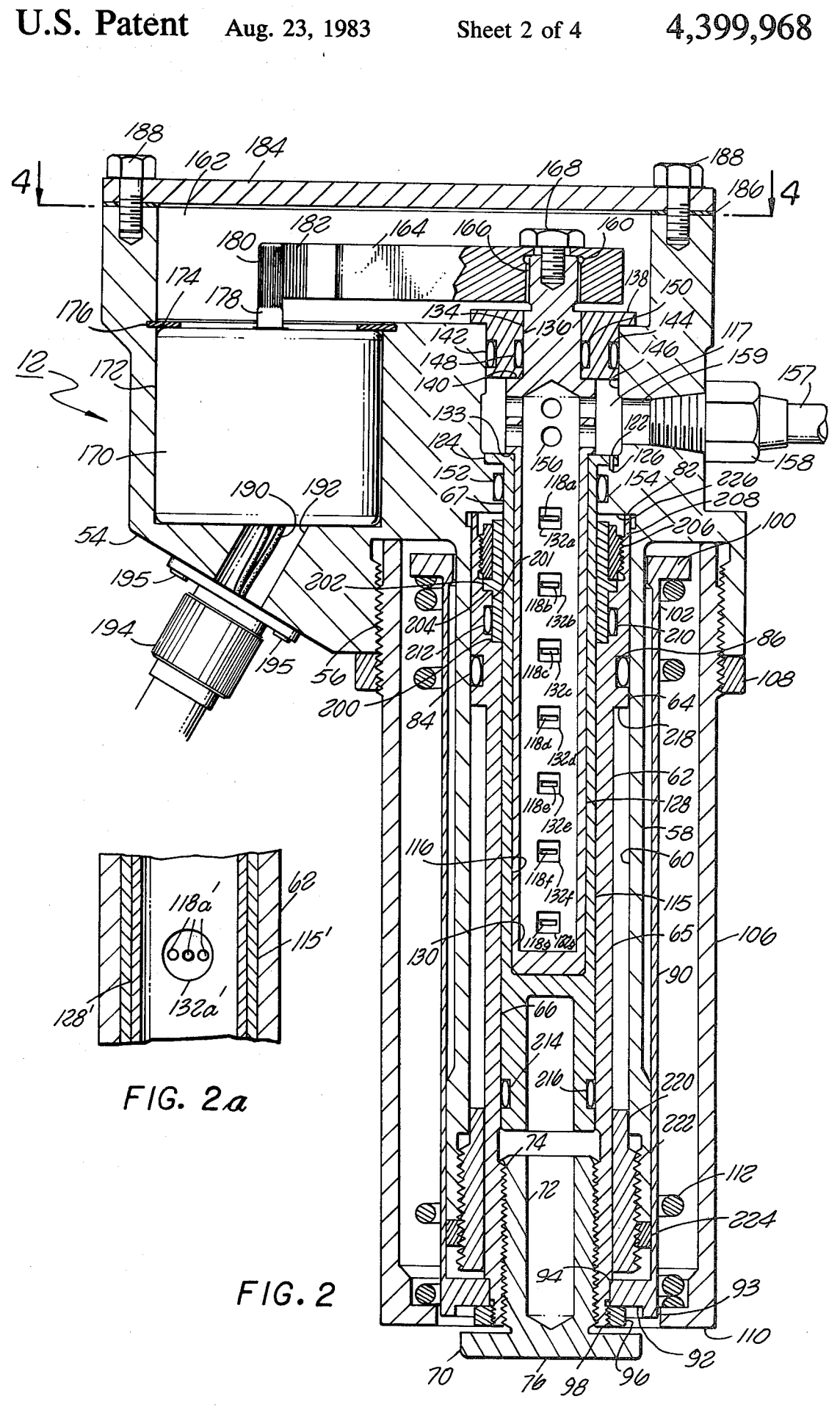
Figure 3:
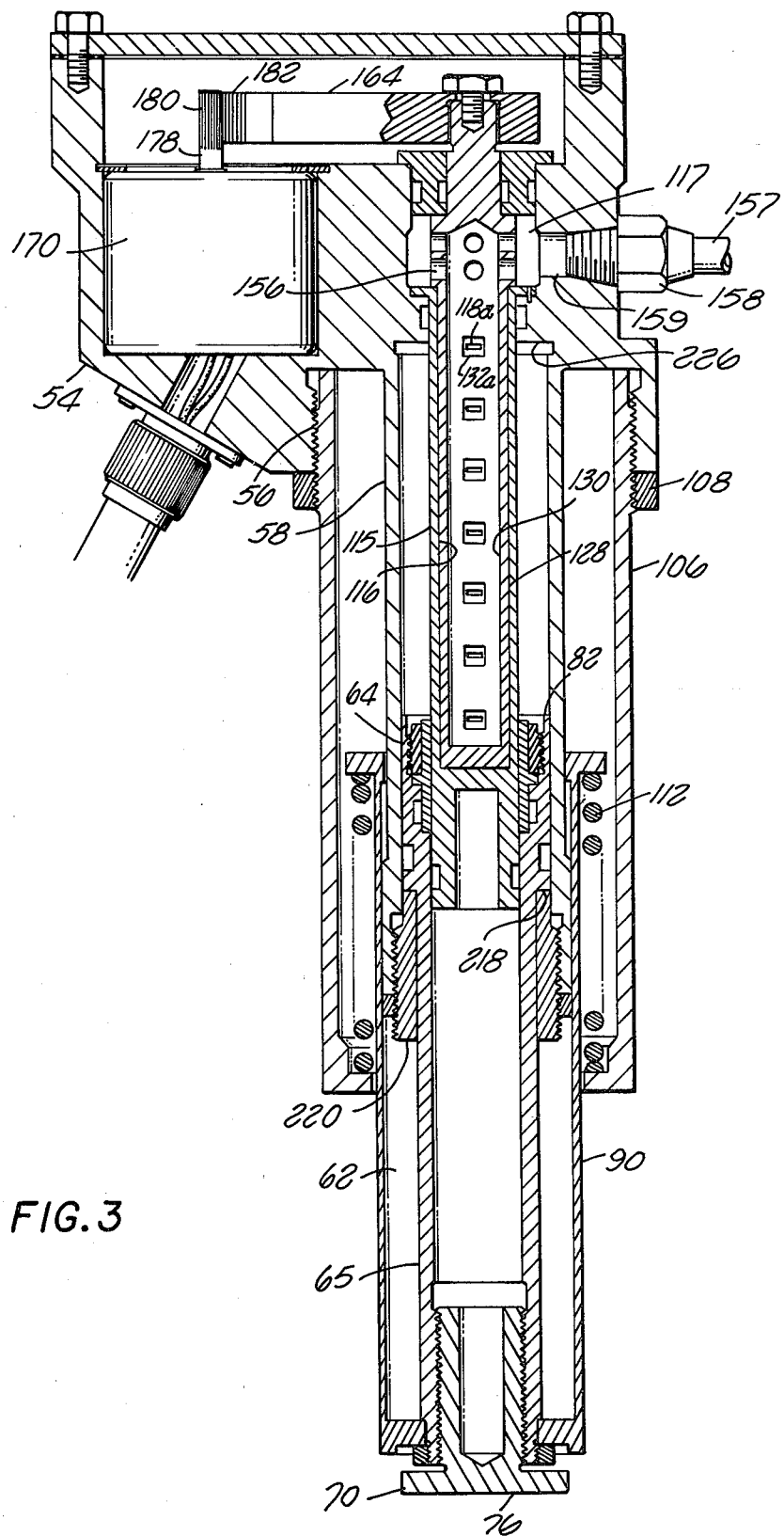
FIG. 3 illustrates the actuator shown in FIG. 2 in the actuated position.
Figure 4:
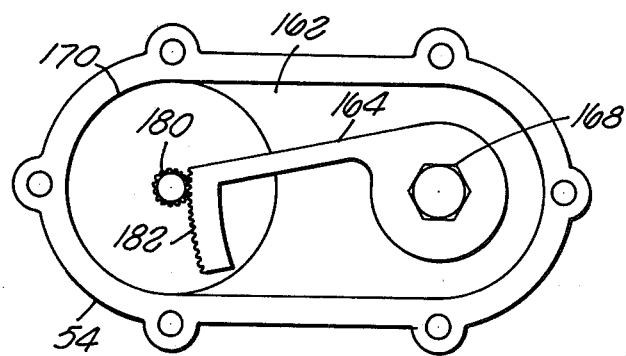
FIG. 4 is a cross-sectional view of the actuator shown in FIG. 2 along the lines 2—2.

After the store 16 is released, actuators 12 and 12a are energized, ejecting the store 16 from the rack 10 in the following manner. Illustrated in FIG. 2 is a cross-sectional view of the actuator 12, shown in FIG. 1 looking inward toward the rack 10. Illustrated in FIG. 3 is the actuator 12 shown in FIG. 2 in the energized position. Still referring to FIG. 1 and additionally to FIG. 2 and FIG. 3, it can be seen that the actuator 12 comprises a housing 54 having a threaded recess 56. Extending from the center of the recess 56 is a pressurizable cylinder 58 having an internal bore 60. Slidably mounted within the bore 60 of the cylinder 58 is a piston assembly 62, comprising piston 64 and piston rod 65, having an internal bore 66. A cap 70, having a threaded portion 72, is installed in an internally threaded portion 74 of the bore 66 of the piston rod 65, and incorporates a head portion 76 for contact with the store 16. Because the upper side 82 of the piston 64 is to be pressurized, a seal in the form of an o-ring 84, mounted in groove 86 on the piston 64, which is provided, seals against the bore 60 of the cylinder 58.

A hollow spring retainer 90, extending about the cylinder 58 and movable thereon, is attached to the piston rod 65. An inward facing flange 92 at end 93 of the retainer 90 abuts against a shoulder 94 on the piston rod, and is secured thereto by locknut 96, which engages externally threaded end 98 of the piston rod. An outwardly facing flange 100 is provided on upper end 102 of the retainer 90. A fixed spring retainer 106, having an inward facing flange 110, is threadably engaged into the recess 56 in the housing 54 and secured thereto by locknut 108. A piston return spring 112 is mounted between flanges 100 and 110 of the retainers 90 and 106, respectively, thus, biasing the piston assembly 62 to a retracted position (first position).

Mounted within the bore 66 of the piston assembly 62, and bore 67 in housing 54, is a fixed tubular member 115 having an internal bore 116. The member 115 incorporates a first array of orifices 118a–g, preferably rectangular in shape. The determination of the size and placement of this first array of orifices will be subsequently discussed in detail; but at least one orifice (118a) is positioned such that a flow path exists between the bore 116 of the member 115 and the portion of the cylinder 58 above the piston 64 when the piston assembly 62 is in the first position. Rotational movement of member 115 is prevented by a pin 122 mounted to and projecting from a flange portion 124 thereof, which engages a hole 126 in the housing 54.

Mounted within the bore 116 of the member 115 and extending into a chamber 117 of the housing 54 is an adjustable tubular member 128 having an internal bore 130. The member 128 incorporates a second array of orifices 132a–g, preferably square in cross section, aligned in a one-to-one relationship with the first array of orifices 118a–g. The member 128 has a first shoulder 133 which abuts against the flange 124 of the member 115. The member 128 has a shaft portion 134 which extends through bore 136 in a cap 138 used to seal off the chamber 117. The cap 138 abuts against second shoulder 140 of member 128 and is secured to the housing 54 by fasteners (not shown). Thus it can be seen that the cap 138 and flange portion 124 of the member 115 positions member 128 within the housing 54.

The chamber 117 is sealed by means of o-ring 142 mounted in groove 144, which seals against surface 146 of housing 54, o-ring 148 mounted in groove 150, which seals against shaft portion 134, and also by o-ring 152 mounted in groove 154, which seals against member 115. The bore 130 of the member 128 is coupled to chamber 117 via ports 156. A hydraulic fluid supply line 157 terminates in a conventional fitting 158, threaded into port 159, which is in communication with the chamber 117.

Member 128 terminates in a splined shaft 160 which extends into cavity 162 of housing 54. A sector gear 164 is attached to the shaft 160 via a splined bore 166 and secured thereto by fastener 168. An electric servomotor 170 is positioned in cavity 172 within the housing 54 and is secured therein by snap-ring 174 installed in groove 176 within the wall of cavity 172. The motor 170 has an output shaft 178 having a plurality of gear teeth 180 engaging gear teeth 182 on the gear 164. The motor 170 is also coupled to an electrical control circuit (not shown) by wires 190 extending through bore 192 to an electrical connector assembly 194 mounted to the housing 54 via fasteners 195. The cavity 162 is sealed by cover plate 184 in combination with gasket 186 which are secured to the housing 54 by fasteners 188.

Thus, it can be seen that with shaft 178 having teeth 180 meshed with teeth 182 on the gear 164 which is attached to member 128, application of an electrical signal, via a control circuit (not shown), to motor 170 will cause member 128 to rotate. By rotating member 128, the second array of orifices 132a–g become misaligned with the first array of orifices 118a–g in the member 115 (as shown in FIG. 3). Thus, the flow rate through each individual orifice 118a–g can be varied. It is also readily apparent that since the first and second array of orifices 118a–g and 132a–g are rectangle and square shaped, respectively, (both parallelograms) the increase in misalignment, and thus decrease in flow rate, is a linear function of the rotation of the shaft 178 of the motor 170. This simples the design of the control circuit (not shown) for the motor. The control circuit would typically terminate in the stores management system computer (not shown), which by using measurements of aircraft velocity, altitude, dive angle, roll rate, pitch rate, stores characteristics, etc. which computes the optimum ejection force, producing optimum store separation, and adjust member 128 accordingly.

It should be noted that the first and second array of orifices 118a–g and 132a–g, respectively, need not be parallelogram shaped. For example illustrated in FIG. 2a is an enlarged view of a portion of FIG. 2 showing an alternate orifice design. Tubular member 115' incorporates a plurality of circular orifices 118a' while member 128' incorporates a circular orifice 132a. Such a design would be cheaper to manufacture.

Again referring to FIGS. 1, 2 and 3, it can be seen that hydraulic fluid entering cylinder 58 via orifices 118a–g will force the piston assembly 62 downward and because the bore 66 will slide over the orifices 118a–g, conventional seals, such as o-rings, cannot be used because they would be cut apart or severely damaged. Therefore, a sliding metal sleeve 200 (which acts as a seal), preferably having a lapped fit to member 115, is installed in recess 201 of piston 64 and is positioned therein by a flange 202 which abuts against shoulder 204. A threaded retainer 206 is installed in threaded portion 208 of the recess 201, and thus, retains the sleeve 200 in place. A seal in the form of an o-ring 210, mounted in groove 212 in the piston 64, is provided for sealing on the exterior of the sleeve 200. Additionally, a seal in the form of o-ring 214, mounted in groove 216 in member 115, is provided to provide sealing between the bore 66 and member 115.

As subsequently discussed, as fluid flows into the cylinder 58, the piston assembly 62 is driven from the retracted or first position (as shown in FIG. 2) downward until surface 218 of the piston 64 contacts snubber 220 (second position). Snubber 220 is threadably engaged in threaded recess 222 and locked in place by locknut 224. Thus, the end 226 of piston 64 and snubber 220 define the stroke of the piston assembly 62.

Figure 5:
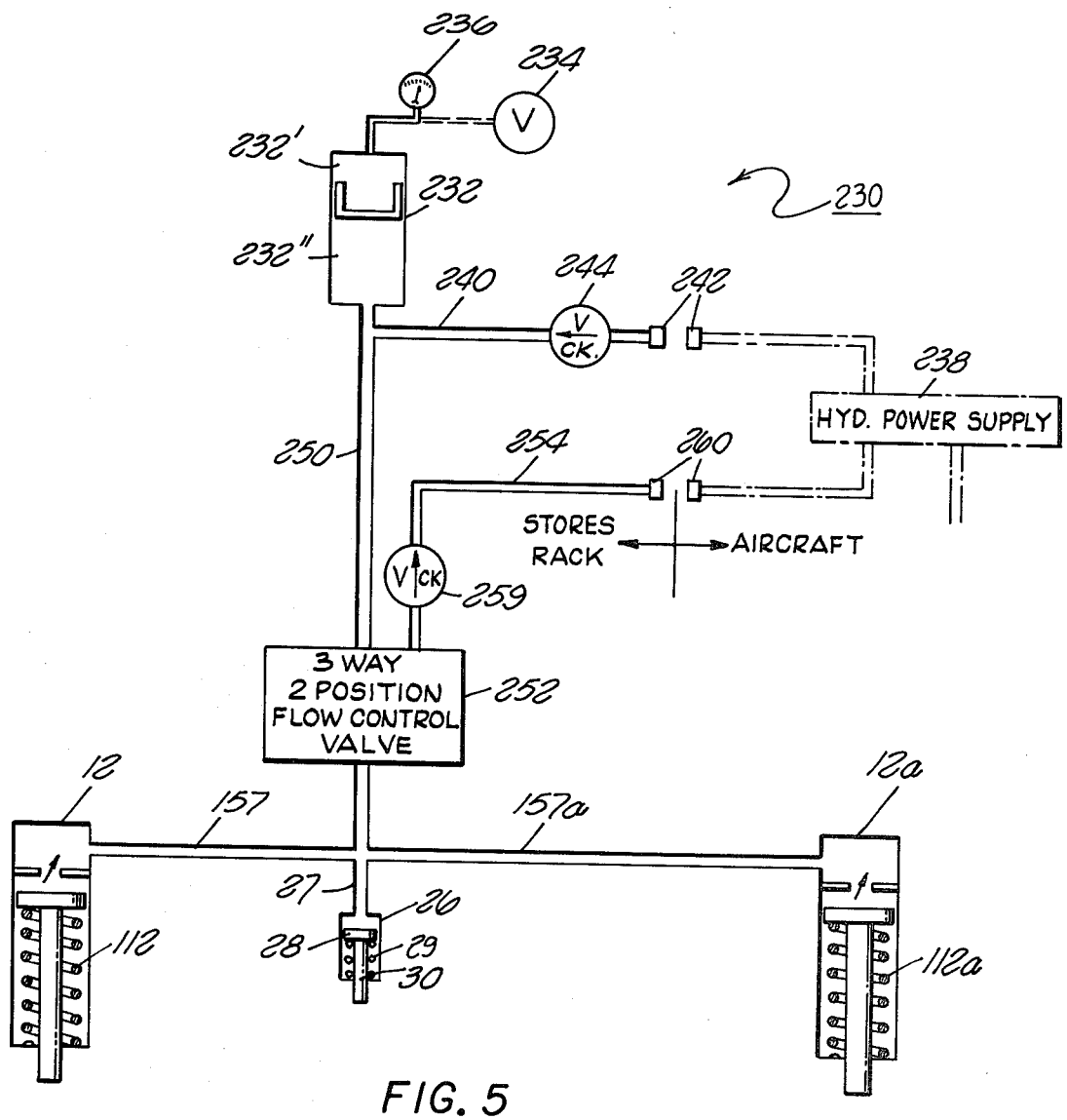
FIG. 5 is a schematic representation of a hydraulic control system for the store ejector rack shown in FIGS. 1 and 2.

Illustrated in FIG. 5 is a schematic representation of a preferred hydraulic control system adapted to provide hydraulic fluid to actuators 12 and 12a, designated by numeral 230. It consists of an accumulator 232, preferably mounted in the rack 10, which can be pressurized on side 232' with gas through valve 234 with the proper pressure level being indicated by the gauge 236. The accumulator 232 is charged on the fluid side 232" with hydraulic fluid from a hydraulic power supply 238 onboard the aircraft via line 240 through disconnect valve 242. A check valve 244 is incorporated into the line 240 to prevent backflow out of the accumulator 232. Also coupled to the accumulator 232 on the fluid side 232" is an output line 250 which is coupled to lines 157 and 157a, which in turn, as previously mentioned, are coupled to actuators 12, 12a and 26 via lines 157, 157a and 27, respectively.

A conventional three-way, two-position flow control valve 252 is installed in the line 250 for control of fluid flow. A valve design suitable for this application is Directional Control Valve Model MV514D, manufactured by the Marotta Scientific Controls, Inc. Boonton, N.J. The valve 252 is coupled to the return side of the hydraulic power supply 238 via return line 254 incorporating check valve 259 and disconnect valve 260. The check valve 259 prevents back flow from the hydraulic power supply. The quick disconnect valves 242 and 260 are provided so that the rack 10 may be easily removed from the aircraft without the loss of hydraulic fluid.

Still referring to FIG. 5 and also back to FIGS. 1 through 4, it can be seen that when the valve 252 is in its first of two positions, hydraulic fluid from the accumulator 232 is prevented from reaching the actuators 12 and 12a and actuator 26 while these same actuators are connected to return line 254. This allows spring 112 in assembly 12 to force the piston assembly 62 to the first position and, thus, any entrapped fluid within the cylinder 58 will be forced into the return line 254. Assembly 12a will function in a similar manner. This will also allow spring 29 of the actuator 26 to retract the piston 28.

Upon actuation of the valve 252 to its second position, hydraulic fluid from the accumulator 232 is applied to the actuator 26 releasing the store 16 by the method previously described and fluid flow to return line 254 is cut off. It is necessary that the operating pressure of actuator 26 be selected at a level significantly lower than that of actuators 12 and 12a in order to prevent the actuators 12 and 12a from being effectively energized prior to retraction of the hooks 20 and 20a. As fluid flows from the accumulator 232 the pressure level therein starts to drop as a function of the flow (equal to the flow rate into the cylinder 58). After release of the store 16, actuators 12 and 12a are energized causing the piston assembly 64 to move from the first position to the second position, ejecting the store 16 from the aircraft.

While the use of a gas/fluid accumulator is preferred, because of its compactness, ability to store very high pressures and the ability to rapidly release the stored energy, a pump could also be used. The problem of pressure reduction as a function of piston stroke would still be present to a significant degree, unless the pump were very large (so large as to make its use on an aircraft impracticable). Furthermore, while the preferred fluid is hydraulic fluid, it should be understood that gas produced by an explosive cartridge, or from a pressurized reservoir, etc., could also be used. The use of a pressurized gas reservoir would have the disadvantage of requiring a source of high pressure gas for recharging.

In the ejection of stores, it is important that the force be applied to the store in a known and controlled manner so that the trajectory of the store can be accurately calculated. To simplify such calculations, a constant ejection force is desirable because it will subject the store to a constant acceleration rate (force/mass=acceleration). Thus, since velocity is equal to the acceleration times time, the velocity at which the store is ejected can easily be determined and will be achieved in the shortest time span.

But, as previously mentioned, the source of pressure, whether it be from a pump, pressurized accumulator, or the like, will vary (typically decreasing) as a function of the stroke of the piston assembly 62. With no compensation the output force will vary in direct proportion. Thus, it is important to provide a mechanism for compensating for any pressure variation of the source during the stroke, thus maintaining a constant pressure level in the cylinder 58. The instant invention solves this problem by uncovering additional orifices 118a-g during the stroke and optimally by varying the size of the individual orifices 118a-g and/or also their placement along member 115 such that the flow area of the total number of orifices uncovered at any point during the stroke are substantially sufficient to maintain the desired constant pressure level thus compensating for variations in the pressure level of the source of fluid.

Of course, there may be circumstances where different store acceleration rates may be desirable. Regardless, the determination of the proper size and spacing of the individual orifices of the first array of orifices 118a-g can be accomplished by calculating the pressure variation of the source of pressurized fluid as a function of piston assembly's 62 position during the stroke, and then calculating the necessary flow rate into the cylinder to maintain the required pressure level vs piston assembly stroke profile. Once the flow rate is known the size and placement of the orifices can be calculated. The number of orifices in the array may vary, but as a general rule, as the number of orifices used increases the closer the actually achieved pressure vs stroke profile approaches the deserved theoretical profile.

It is also apparent that not only can the store 16 be ejected with a constant force, but also the constant force level may be varied by rotation of member 128, which will vary the overlap of the first and second array of orifices 118*a–h* and 132*a–h*. Furthermore, as previously mentioned, it may be desirable to pitch the store 16 upon ejection from the aircraft. This can be accomplished by the pilot selectively adjusting member 128 of actuator 12, through the stores management computer, to a different position than the corresponding tubular member (not shown) in actuator 12*a* by means of the motor control circuit (not shown), so that the output force applied by actuator 12 to store 16 is different from that applied by actuator 12*a*.

Finally, while the actuator has been described with reference to a particular embodiment, it should be understood that such an embodiment is merely illustrative as there are numerous variations and modification which may be made by those skilled in the art. Thus, the invention is to be construed as being limited only by the spirit and scope of the appended claims.

Therefore, we claim:

1. An actuator for ejecting an article from an aircraft comprising:
   a closed cylinder;
   a fixed tubular member coupled to a source of fluid under pressure having a first array of orifice means for flowing said fluid into said cylinder;
   a piston assembly adapted to engage and eject said article, said piston assembly slidably mounted within said cylinder and telescopically movable over said fixed tubular member from a first position, wherein said piston assembly covers a portion less than all of said first array of orifice means, thereby leaving an uncovered portion of said first array of orifice means, to a second position, wherein said first array of orifice means are uncovered, said first and second positions defining the stroke of said piston assembly, said uncovered portion of said first array of orifice means gradually increasing as said piston assembly moves through said stroke; and
   means for selectively intiating fluid flow from said source of fluid, said uncovered portion of said first array of orifice means metering said fluid into said cylinder when fluid flow is initiated such that said piston assembly is forced under a preselected pressure versus stroke profile from said first position to said second position to eject said article.

2. The actuator of claim 1, wherein said pressure of said source of said fluid varies as a function of the flow of said fluid into said cylinder during said stroke of said piston assembly and the cross-sectional area of each of said orifice means of said first array is selected to meter said flow into said cylinder at a rate sufficient to maintain said pre-selected pressure vs stroke profile within said cylinder, as said covered portion of said first array of orifice means are uncovered during said stroke.

3. The actuator of claim 1, wherein said pressure of said source of fluid varies as a function of the flow of said fluid into said cylinder during said stroke of said piston assembly and the spacing of each of said orifice means of said first array is selected to meter said flow into said cylinder at a rate sufficient to maintain said pre-selected pressure vs stroke profile within said cylinder, as said covered portion of said first array of orifice means are uncovered during said stroke.

4. The actuator of claim 1, wherein said pressure of said source of fluid varies as a function of the flow of said fluid into said cylinder during said stroke of said piston assembly and the cross-sectional area and spacing of each of said orifice means of said first array is selected to meter said flow into said cylinder at a rate sufficient to maintain said pre-selected pressure vs stroke profile within said cylinder, as said covered portion of said first array of orifice means are uncovered during said stroke.

5. The actuator of claim 1, or 2, or 3, or 4, further including means to vary the magnitude of said preselected pressure vs stroke profile.

6. The actuator of claim 5, wherein said fixed tubular member incorporates a bore in communication with said first array of orifice means, and
   said means to vary said magnitude of said pre-selected pressure vs stroke profile comprises;
      an adjustable tubular member, rotatably mounted in said bore of said fixed tubular member coupled to said source of fluid, said adjustable tubular member having a second array of orifice means in an aligned relationship with said first array of orifice means; and
      means to rotate said adjustable tubular member for varying the overlap of said first and second array of orifice means, such that said pre-selected pressure vs stroke profile within said cylinder can be varied.

7. The actuator of claim 6, wherein said means to rotate said adjustable tubular member is an electric motor coupled to said adjustable tubular member 8. The actuator of claim 1, or 2, or 3, or 4, wherein said orifice means of said first array are orifices in the shape of parallelograms.

9. The actuator of claim 1, or 2, or 3, or 4, wherein said fluid is a hydraulic fluid.

10. The actuator of claim 9, wherein said source of hydraulic fluid is a gas pressurized accumulator.

11. The actuator of claim 1, or 2, or 3, or 4, wherein said preselected pressure versus stroke profile includes a constant pressure throughout the stroke.

12. The actuator of claim 1 also including resilient means for normally biasing said piston assembly to said first position.

13. The actuator of claim 1 wherein when said piston is in said first position, said covered portion of said first array of orifice means represents a majority of the cross-sectional area of said first array of orifice means.

14. An actuator system for ejecting an article from an aircraft comprising a pair of actuators mounted at a discrete distance from each other in said aircraft adapted to engage said article; each of said actuators comprising:
   a closed cylinder;
   a fixed tubular member coupled to a source of fluid under pressure having a first array of orifice means for flowing said fluid into said cylinder;
   a piston assembly adapted to engage and eject said article, said piston assembly slidably mounted within said cylinder and telescopically movable over said fixed tubular member from a first position, wherein said piston assembly covers a portion less than all of said first array of orifice means, thereby leaving an uncovered portion of said first array of orifice means, to a second position, wherein said first array of orifice means are uncovered, said first and second positions defining the stroke of said piston assembly, said uncovered portion of said first array of orifice means gradually increasing as said piston assembly moves through said stroke;

means for selectively initiating fluid flow from said source of fluid, said uncovered portion of said first array of orifice means metering said fluid into said cylinder when fluid flow is initiated such that said piston is forced under a preselected pressure versus stroke profile from said first position to said second position to eject said article; and means to vary the magnitude of said preselected pressure versus stroke profile such that the magnitude of said peselected pressure versus stroke profile in each of said actuators can be varied so as to eject said article at a desired pitch angle.

15. The actuator system of claim 14, wherein said source of said fluid varies as a function of the flow of said fluid into said cylinder during said stroke of said piston assembly and the cross-sectional area of each of said orifice means of said first array is varied to meter said flow into said cylinder to maintain said pre-selected pressure vs stroke profile within said cylinder.

16. The actuator system of claim 14, wherein said pressure of said source of fluid varies as a function of the flow of said fluid into said cylinder during said stroke of said piston assembly and the spacing of each of said orifice means of said first array is varied to meter said flow into said cylinder at a rate sufficient to maintain said pre-selected pressure vs stroke profile within said cylinder.

17. The actuator system of claim 14, wherein said pressure of said source of fluid varies as a function of the flow of said fluid into said cylinder during said stroke of said piston assembly and the cross-sectional area and spacing of each of said orifice means of said first array is varied to meter said flow into said cylinder to maintain said pre-selected pressure vs stroke profile within said cylinder.

18. The actuator system of claim 14, or 15, or 16, or 17, wherein said fixed tubular member incorporates a bore in communication with said first array of orifice means, and said means to vary said magnitude of said pre-selected pressure vs stroke profile comprises;

an adjustable tubular member, rotatably mounted in said bore of said fixed tubular member coupled to said source of fluid, said adjustable tubular member having a second array of orifice means in an aligned relationship with said first array of orifice means; and means to rotate said adjustable tubular member for varying the overlap of said first and second array of orifice means, such that said pre-selected pressure vs stroke profile within said cylinder can be varied.

19. The actuator system of claim 18, wherein said means to rotate said adjustable tubular member is an electric motor coupled to said adjustable tubular member and adapted to rotate said adjustable tubular member.

20. The actuator system of claim 17 also including resilient means for normally biasing said piston assembly to said first position.

21. The actuator of claim 17 wherein when said piston is in said first position, said covered portion of said first array of orifice means represents a majority of the cross-sectional area of said first array of orifice means.

* * * * *